Sept. 25, 1934.   W. E. GUNDELFINGER   1,974,611
CORN POPPER STIRRER
Filed Oct. 31, 1932
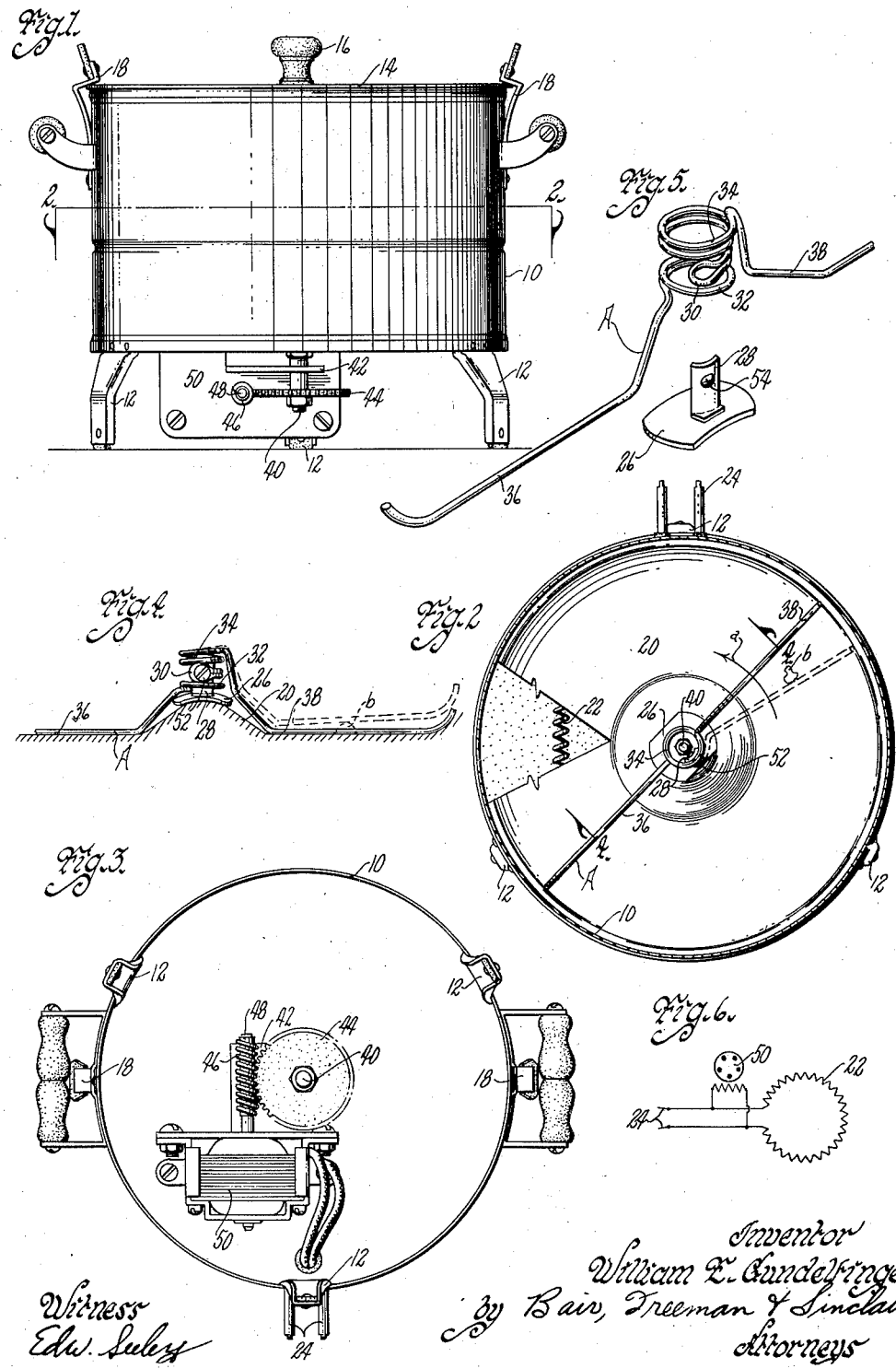
Inventor
William E. Gundelfinger
by Bair, Freeman & Sinclair
Attorneys
Witness
Edw. Seeley Patented Sept. 25, 1934

1,974,611

UNITED STATES PATENT OFFICE 1,974,611

CORN POPPER STIRRER

William Edward Gundelfinger, Belleville, Ill., assignor to Knapp-Monarch Company, Belleville, Ill., a corporation of Missouri Application October 31, 1932, Serial No. 640,416

2 Claims. (Cl. 259—108)

The object of this invention is to provide a corn popper stirrer which is simple, durable and comparatively inexpensive to manufacture.

A further object is to provide a stirrer especially adapted for an electric corn popper, the stirrer being operated by an electric motor.

Still a further object is to provide a stirrer comprising a rod of resilient material doubled to form a loop at its central part whereby a screw may extend through the loop and secure the stirrer to a rotatable hub, the parts of the rod being coiled adjacent the loop and the terminal ends extending in laterally opposite directions to act as stirrer arms.

Still a further object is to provide a stirrer for a corn popper which is of resilient construction so that it can easily pass over obstructions on the corn popper surface without the necessity of having a powerful motor for operating it.

With these and other objects in view my invention consists in the construction, arrangement and combination of the various parts of my device, whereby the objects contemplated are attained, as hereinafter more fully set forth, pointed out in my claims and illustrated in the accompanying drawing, in which:—

Figure 1 is a side elevation of a corn popper to which my invention is applied.

Figure 2 is a plan view of the same showing the plate removed and part of the popper surface broken away to show a heating element for heating the popper surface.

Figure 3 is a bottom plan view of the popper showing the motor and its connection to the stirrer shaft.

Figure 4 is a sectional view on the line 4—4 of Figure 2.

Figure 5 is a perspective view of the stirrer element and the hub which supports it; and Figure 6 is a diagrammatic view of the electric connections of the heating element and motor of the corn popper and stirrer respectively.

On the accompanying drawing I have used the reference numeral 10 to indicate a casing. It is supported by legs 12 and has a cover 14. The cover 14 is provided with a knob 16 for convenience in handling it. The cover is normally retained in position by spring latches 18.

Within the container 10 a popper surface 20 is provided. It is heated by a heating element 22. The heating element is connected with prongs 24 whereby the element may be included in an electric circuit.

My corn popper stirrer will now be described in connection with the corn popper thus far described. The stirrer element comprising a disc 26 having an extension or hub 28 thereon and a stirrer rod A. The rod A is formed by looping a piece of resilient wire at its center to form the loop or eye 30. The portions of the rod adjacent the eye are coiled as indicated at 32 and 34. The coils 32 and 34 terminate in stirrer arms 36 and 38 respectively. These arms are formed to fit the radial contour of the popper surface 20.

The disc 26 is secured to a stirrer shaft 40. The shaft 40 extends downwardly through the popper surface 20 and is suitably journaled in a bearing plate 42. Secured to its lower end is a worm gear 44. The worm gear 44 meshes with a worm 46 secured to the shaft 48 of an electric motor 50. The motor 50 is connected with the prongs 24 as shown in Figure 6 so that whenever the heating element 22 is energized the motor likewise is energized.

During corn popping operations the stirrer rod A rotates in the direction of the arrow $a$ in Figure 2 for preventing any of the pop corn from remaining too long in one place on the popper surface 20. Stirrers are ordinarily provided which positively follow the contour of the popper surface and which when they meet an obstruction such as corn stuck to the popper surface they scrape it therefrom. In order to do this quite a powerful motor is necessary. With spring arms as disclosed on my patent drawing, however, an obstruction such as $b$, shown in Figure 2, when encountered will cause the arm 36 or 38, as the case may be, to remain in the dotted position during further rotation of the hub 28. Finally the spring tension of the coil 32 or 34 will be built up to such an extent as to either break the obstruction loose or cause the stirrer arm to spring up over it. This is all accomplished with the motor continuing to rotate due to its energization and momentum where if the arm were solid a small motor would be stalled.

The stirrer arms successively striking the obstruction $b$ will finally wear it away without stalling of the motor. The coils 34 and 34 are preferably wound from the eye 30 in the direction of rotation of the hub 28 so that they tend to loosen thereon when obstructions are struck.

The particular formation of the wire A makes it possible to form the two arms from a single piece of material. It may be readily formed on forming dies and easily assembled by means of a screw 52 extending through the loop 30 and into a threaded opening 54 of the hub 28.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:—

1. A stirrer element comprising a doubled rod of resilient material having an eye at its doubled part, parts of said rod thereadjacent being coiled in the same direction, one coil having more turns than the other and the terminating ends extending from the coils in opposite directions.

2. A stirrer element comprising a doubled rod of resilient material having a loop at its doubled part, parts of said rod thereadjacent being coiled in the same direction, the terminating ends extending from the coils in opposite directions, a hub and means extending through said loop and engaging said hub to retain said stirrer element on said hub.

WILLIAM EDWARD GUNDELFINGER.